Patented May 3, 1932

1,856,613

UNITED STATES PATENT OFFICE

HUGO ACKERMANN, OF BONN-ON-THE-RHINE, GERMANY

PROCESS OF PRODUCING REFRACTORY, ACID-PROOF AND OTHER CERAMICALLY BONDED PRODUCTS

No Drawing. Application filed December 14, 1926, Serial No. 154,854, and in Germany December 19, 1925.

This invention relates to a process of producing ceramically bonded products, especially products which are refractory and acid-proof and which are prepared from a binding substance and from non-plastic materials.

The new process consists in mixing the non-plastic materials, which have been preliminarily granulated, with binding substances rich in alumina, said binding substances having been first transformed into a castable state by means of water with addition of electrolytes. The mass is therefore divided into binding substance and non-plastic material. The binding substance is converted separately into a castable slip by the addition of an electrolyte, whereupon this casting slip is mixed with non-plastic material and the mixture is then moulded under a strong mechanical treatment, and burnt.

The liquefying of the binding substance is specially important, electrolytes, as for instance, alkali, alkali carbonates, alkali silicates, being used for this purpose. Besides, as addition, protecting colloids can be used, which are capable of favoring liquefaction of the binding substance, for instance highly molecular substances, ulmous substances, humate dextrine and lixiviations of cellulose, that is the waste lye from the manufacture of cellulose.

As binding substance kaolin or china clay is preferably used, other binding substances rich in alumina are used, even such which are not mouldable in the natural state. As examples may be mentioned: beauxite and similar alumina minerals, alumina-silicic acid minerals, as sillimanite, andalusite, cyanite, and further highly aluminous schistous clays. These substances have first to be rendered mouldable and binding by the most extensive refining, whereupon the slipping is effected.

To these binding substances belong further the different forms of alumina, as hydrate of alumina, burnt alumina, molten alumina. The alumina must also be first rendered mouldable by refining.

The object of the new process is always, to apply the binding substance in a finely ground state and to utilize it as a casting slip in dispersed, colloidal form. The binding capacity is thus considerably increased and the possibility is created thereby, to reduce as much as possible the quantities of binding substances compared with the amount of non-plastic materials. At the same time a uniform mixing with the non-plastic materials is obtained by the fine distribution i. e. surrounding of every grain of non-plastic material with a thin layer of the binding substance, for instance of the kaolin.

The new manufacturing process is consequently especially adapted for very lean masses having a preponderance of non-plastic material and only a very small portion of binding substance, which portion may be only a small percent.

If very lean masses are to be utilized, it is advisable to make the kaolin-slip or the slip of the binding substance rich in alumina more thinly liquid by addition of a larger quantity of water than necessary to make castable the kaolin-slip, in order to ensure thus the complete surrounding of every grain of non-plastic material that is the lean material. The water added in excess can be removed from the finished mixture prior to the moulding, as far as necessary, by well known means, for instance by heat.

A complete and rapid mixing of the mass can be also obtained by transforming a portion of the non-plastic material, preferably a portion of the finest grain component together with the kaolin or other binding substance, into castable state, and this casting slip, consisting of the binding substance rich in alumina and of fine grains of non-plastic material, can then be admixed with the remaining portion of non-plastic material. In this instance a part of the mixing work is done already when producing the casting slip, and the remainder of the non-plastic material will then be more easily coated by this larger mass than by the smaller mass of the pure binding substance or kaolin slip.

As non-plastic material all the commonly used gobbing or additions, especially those which are employed for refractory products, may be used in the new manufacturing process of ceramic products. Non-plastic materials are for instance, chamotte, i. e. burnt clay, which for the present process is eventually preliminarily burnt to a high degree. Further may be mentioned: burnt alumina in grains, corundum, sillimanite or other alumina silicic acid mineral, artificially produced alumina silicic acid bodies, also carbides, zirconium-compounds, especially oxides as chromic oxide, magnesium oxide, burnt dolomite, silicic acid.

The mechanical treatment to be carried out consists in beating, stamping or pressing the mass composed of non-plastic materials and casting slip.

Under the influence of the electrolyte the mixture of water and the aluminous binding substance is transformed into a liquid slip, a real colloidal solution, in which the binding substance is present in a colloidal, disperse state. This liquid slip of binding means may easily be mixed with the ground non-plastic material in any suitable mixing device. The qualities of the colloidal solution are retained as long as its content of water is not reduced. If, after standing some time its consistence becomes less liquid, or it turns into a jelly, a suitable stirring or shaking will suffice to restore the liquid state. Even after being admixed with the non-plastic material, whereby the slip of binding means surrounds each grain in form of a thin film, the concussions occurring in the molding of the mass in the manner described cause a certain return of the liquid, mobile state of the slip, thereby facilitating the molding operation, by considerably diminishing the friction between the adjoining grains of the mass.

In consequence of this surprising quality of the colloidal solution of binding means, a mass prepared and molded in the manner described gives most satisfactory results as to the denseness of the molded blocks. In fact, the porosity of the finished product depends only upon the sizing of the grains of non-plastic material used for a certain mass, as it is possible in the described manner of molding to bring each grain into close contact with the adjoining grains in the mass.

In this way, only a very small quantity of the binding slip is necessary and desired as binding medium between the grains of the mass. A further small quantity of slip serves to fill the little holes which remain in the mass, according to the sizes of the grains. Some of the slip may eventually be adsorbed by the non-plastic material, if a more porous kind is used, but no absorption takes place when the non-plastic material is thoroughly vitrified.

An excess of binding-means slip in the mass impairs the molding process and may cause damage to the shapes of the molded blocks after the mold has been taken off. Therefore, it is essential to ascertain just the right proportion of binding-means slip for each mixture, which is attained by preparing a mass that is not castable, but suitable for molding under strong mechanical treatment.

As set forth, the quantity of binding-means slip depends on the kind and on the size of the grains of the non-plastic material used. The best and simplest way to determine the necessary percentage of binding-means slip with a given kind of non-plastic material is to mix a small quantity and make mold tests. With some experience, acquired by practice, the right relation of quantities between each kind of non-plastic material and binding-means slip is easily ascertained. The relation is, for instance, satisfactory when no excess of the binding-means slip shows up on the surface of the molded test pieces, and when these keep their shape after being taken out of the molds.

In using china-clay as a binding means, a suitable composition of the liquid slip of binding means consists of Dry china-clay _____ 62.5%
Caustic soda _____ 0.63%  } Electrolytes
Humic acid _____ 0.31%
Water _____ 36.56%

19% of this china-clay slip admixed with 81% of a suitable ground grog gives a satisfactory mass prepared after the invention, containing 81% grog
11.8% china-clay
0.12% $Na_2CO_3$
0.06% humic acid
6.9% water.

This mass is molded according to the invention by beating, stamping or pressing.

A binding-means slip with a higher content of alumina has, for instance, the following composition—

Ball clay _____ 24%
Aluminium hydrate _____ 31%
Caustic soda _____ 0.17% } Electrolytes
Humic acid _____ 0.08%
Water _____ 45%

This binding-means slip may be used for bonding corundum. If 12% of the slip is admixed with 88% of a suitable ground corundum, the mass contains—

88% corundum
2.9% ball clay
3.7% aluminium hydrate
0.02% caustic soda
0.01% humic acid
5.4% water and may be molded according to the invention by beating, stamping or pressing.

If sufficiently lean masses of non-plastic materials are at disposal which are sufficiently invariable as regards volume or which have become invariable as regards volume by preliminary burning, the new products may be used unburnt. They possess such great mechanical resistance that they can stand transport and subsequent treatment. The burning can be then done after they have been built into the working oven.

By the new process bodies are produced of uniform solid structure, lowest shrinkage at burning, high constancy of volume and great resisting capability against fluctuation of temperatures. They resist the highest stresses, especially the simultaneous action of pressure and high temperature, so that they are specially stable, the more so if the non-plastic materials have been selected accordingly.

Claims:—

1. A process of making refractory, acid-proof and other ceramically bonded products, comprising mixing aluminous binding material of less plasticity than clay with water to render the mixture to castable consistency with an electrolyte, adding to the mixture ground non-plastic material to form a non-castable mass capable of being shaped, shaping under pressure, drying and firing the mass.

2. A process of making refractory, acid-proof and other ceramically bonded products, comprising mixing aluminous material of less plasticity than clay with water and alkali, adding to the mixture ground non-plastic material, to a non-castable consistency capable of being shaped, shaped under pressure, drying and firing the mass.

3. A process of making refractory, acid-proof and other ceramically bonded products, comprising mixing aluminous material of less plasticity than clay with water, alkali and a protecting colloid to castable consistency, adding to the mixture ground non-plastic material to non-castable consistency but capable of being shaped, and shaping, drying and firing the mass.

4. A process of making refractory, acid-proof and other ceramically bonded products, comprising mixing aluminous material of less plasticity than clay with water and a substance capable of rendering the mixture more limpid, and a quantity of ground non-plastic material to a castable consistency, then adding a further quantity of ground non-plastic material sufficient to render the mass non-castable, then pressing to shape, drying and firing the mass.

5. A process of making refractory acid-proof and other ceramically bonded products, comprising mixing aluminous material of less plasticity than clay, an alkali and a protecting colloid with water, adding to the mixture ground non-plastic material to form a thin liquid mass, then adding to the mixture an additional quantity of the ground non-plastic material sufficient to render the mass non-castable, pressing to shape, drying, and firing the stiff mass.

6. A process of making refractory, acid-proof and other ceramically bound products, comprising mixing kaolin, an alkali and a protecting colloid with water to a thin consistency, adding thereto a portion of ground burnt clay sufficient to render the mixture castable and then adding a further quantity of burnt clay to form a stiff mass, pressing to shape the mass, and firing the same.

7. A process of making refractory, acid-proof and other ceramically bonded products comprising mixing aluminous material of less plasticity than clay with liquefying ingredients and an excess of water into a diluted slip, adding to the mixture ground non-plastic material as to obtain a mass containing 10% or less of binding substances, removing from the mixture the excess of water as far as necessary to enable shaping, shaping under pressure, drying and firing the mass.

8. A process of making refractory, acid-proof and other ceramically bonded products, comprising mixing aluminous material of less plasticity than clay with liquefying ingredients and a protecting colloid and an excess of water into a diluted slip, adding to the mixture ground non-plastic material as to obtain a mass containing 10% or less of binding substances, removing from the mixture the excess of water as far as necessary to enable shaping, shaping under pressure, drying and firing the mass.

9. A process of making refractory, acid-proof and other ceramically bonded products comprising mixing aluminous material of less plasticity than clay with water to render the mixture to castable consistency with an electrolyte, adding to the mixture ground non-plastic material, of volume constancy at high temperatures, to form a non-castable mass capable of being shaped, shaping under pressure, drying the mass and firing it after having been built into furnaces.

10. A process of making refractory, acid-proof and other ceramically bonded products, comprising mixing aluminous material of less plasticity than clay with water and a substance capable of rendering the mixture more limpid and a quantity of ground non-plastic material of volume-constancy at high temperatures to a castable consistency then adding a further quantity of ground non-plastic material, of volume-constancy at high temperatures, sufficient to render the mass non-castable, then pressing to shape, drying and firing the mass after having been built into furnaces.

11. A process of making refractory, acid-proof and other ceramically bonded products comprising mixing aluminous material of less plasticity than clay with liquefying ingredients and an excess of water into a diluted slip, adding to the mixture ground non-plastic material of volume-constancy at high temperatures, sufficient to render the mass non-castable, then pressing to shape, drying the mass and firing it after having been built into furnaces.

12. A process of making refractory, acid-proof and other ceramically bonded products comprising mixing aluminous material of less plasticity than clay, with water to render the mixture to castable consistency with an electrolyte and a protecting colloid, adding to the mixture ground non-plastic material of volume-constancy at high temperatures, to form a non-castable mass capable of being shaped, shaping under pressure, drying the mass and firing it after having been built into furnaces.

13. A process of making refractory, acid-proof and other ceramically bonded products, comprising mixing aluminous material of less plasticity than clay with water and a substance capable of rendering the mixture more limpid and a protecting colloid and a quantity of ground non-plastic material of volume-constancy at high temperatures to a castable consistency, then adding a further quantity of ground non-plastic material of volume-constancy at high temperatures, sufficient to render the mass non-castable, then pressing to shape, drying the mass and firing it after having been built into furnaces.

14. A process of making refractory, acid-proof and other ceramically bonded products comprising mixing aluminous material of less plasticity than clay with liquefying ingredients, a protecting colloid, and an excess of water into a diluted slip, adding to the mixture ground non-plastic material of volume-constancy at high temperatures, to obtain a mass containing 10% or less of binding substances, removing from the mixture the excess of water as far as necessary for shaping, shaping under pressure, drying the mass and firing it after having been built into furnaces.

15. A process of making refractory, acid-proof and other ceramically bonded products, comprising mixing kaolin with water and an electrolyte to a castable consistency, adding to the mixture sufficient ground non-plastic material to form a non-castable mass capable of being shaped, shaping under pressure, and drying and firing the mass.

16. A process of making refractory, acid-proof and other ceramically bonded products, comprising mixing kaolin with water and alkali, adding to the mixture non-plastic material to form a non-castable mass capable of being shaped, shaping under pressure and drying and firing the mass.

17. A process of making refractory, acid-proof and other ceramically bonded products, comprising mixing kaolin with water, alkali and a protecting colloid to castable consistency, adding to the mixture sufficient ground plastic material to render it non-castable but capable of being shaped, shaping, drying and firing the mass.

18. A process of making refractory, acid-proof and other ceramically bonded products, comprising mixing kaolin with water and a substance capable of rendering the mixture more limpid and a quantity of ground non-plastic material to a castable consistency; then adding a further quantity of ground non-plastic material sufficient to render the mass non-castable, then pressing to shape, drying and firing the mass.

19. A process of making refractory, acid-proof and other ceramically bonded products, comprising mixing kaolin, an alkali and a protecting colloid with water, adding to the mixture ground non-plastic material to form a thin liquid mass, then adding to the mixture an additional quantity of the ground non-plastic material sufficient to render the mass non-castable pressing to shape, drying, and firing the mass.

20. A process of making refractory, acid-proof and other ceramically bonded products, comprising mixing aluminous binding material of less plasticity than clay with water and an electrolyte to castable consistency, adding to the mixture ground nonplastic material to form a non-castable mass capable of being shaped, shaping under pressure, drying and firing the mass.

21. A process of making refractory, acid-proof and other ceramically bonded products, comprising mixing aluminous binding material of less plasticity than clay with water, alkali and a protecting colloid to castable consistency, adding to the mixture sufficient ground non-plastic material to render it non-castable but capable of being shaped, and shaping, drying and firing the mass.

22. A process of making refractory, acid-proof and other ceramically bonded products, comprising mixing aluminous binding material of less plasticity than clay with water, a substance rendering the mixture more limpid and a quantity of ground non-plastic material to a castable consistency, then adding a further quantity of ground non-plastic material sufficient to render the mass non-castable, then pressing to shape, drying and firing the mass.

23. A process of making refractory, acid-proof and other ceramically bonded products, comprising mixing aluminous material of less plasticity than clay, an alkali and a protecting colloid with water, adding to the mixture ground non-plastic material to form a thin liquid mass, then adding to the mixture an additional quantity of the ground non-plastic material sufficient to render the mass non-castable, pressing to shape, drying and firing the stiff mass.

24. A process of making refractory, acid-proof and other ceramically bonded products, comprising mixing aluminous binding material of less plasticity than clay with liquefying ingredients and an excess of water into a diluted slip, adding to the mixture ground non-plastic material to obtain a mass containing 10% or less of binding substances, removing from the mixture the excess of water so far as necessary to enable shaping, shaping under pressure, drying and firing the mass.

25. A process of making refractory, acid-proof and other ceramically bonded products, comprising mixing aluminous binding material of less plasticity than clay with liquefying ingredients, a protecting colloid and an excess of water into a diluted slip, adding to the mixture ground non-plastic material to obtain a mass containing 10% or less of binding substances, removing from the mixture the excess of water so far as necessary to enable shaping, shaping under pressure, drying and firing the mass.

26. A process of making refractory, acid-proof and other ceramically bonded products, comprising mixing aluminous binding material of less plasticity than clay with water, a substance capable of rendering the mixture more limpid and a quantity of ground non-plastic material of volume-constancy at high temperatures to a castable consistency, then adding a further quantity of ground non-plastic material of volume-constancy at high temperatures sufficient to render the mass non-castable, then pressing to shape, and drying the mass, and firing the mass after having been built into furnaces.

27. A process of making refractory, acid-proof and other ceramically bonded products, comprising mixing aluminous binding material of less plasticity than clay with water to castable consistency with an electrolyte and a protecting colloid; adding to the mixture ground non-plastic material of volume constancy at high temperatures to form a non-castable mass capable of being shaped, shaping under pressure and drying the mass and firing it after it has been built into furnaces.

28. A process of making refractory, acid-proof and other ceramically bonded products, comprising mixing aluminous binding material of less plasticity than clay with liquefying ingredients and an excess of water into a diluted slip, adding to the mixture ground non-plastic material of volume constancy at high temperatures sufficient to render the mass non-castable, then pressing to shape, drying the mass and firing it after having been built into furnaces.

29. A process of making refractory, acid-proof and other ceramically bonded products, comprising mixing aluminous binding material of less plasticity than clay with liquefying ingredients, a protecting colloid and an excess of water into a diluted slip; adding to the mixture ground non-plastic material of volume-constancy at high temperatures to obtain a mass containing 10% or less of binding substances, removing from the mixture the excess of water so far as necessary for shaping, shaping under pressure, drying the mass, and firing it after having been built into furnaces.

In testimony that I claim the foregoing as my invention, I have signed my name.

Dr. HUGO ACKERMANN.